(12) United States Patent
Jokschas et al.

(10) Patent No.: US 10,143,947 B2
(45) Date of Patent: Dec. 4, 2018

(54) FILTER ELEMENT AND FLUID FILTER WITH RADIAL VENT HOLE

(71) Applicant: MANN+HUMMEL GMBH, Ludwigsburg (DE)

(72) Inventors: Guenter Jokschas, Murrhardt (DE); Stefan Eichinger, Gerlingen (DE)

(73) Assignee: Mann+Hummel GmbH, Ludwigsburg (DE)

( * ) Notice: Subject to any disclaimer, the term of this patent is extended or adjusted under 35 U.S.C. 154(b) by 791 days.

(21) Appl. No.: 14/633,248

(22) Filed: Feb. 27, 2015

(65) Prior Publication Data

US 2015/0238883 A1 Aug. 27, 2015

(30) Foreign Application Priority Data

Feb. 27, 2014 (DE) .................. 10 2014 002 631

(51) Int. Cl.
*B01D 27/08* (2006.01)
*B01D 35/00* (2006.01)
*B01D 36/00* (2006.01)
*B01D 27/14* (2006.01)

(52) U.S. Cl.
CPC .......... *B01D 35/005* (2013.01); *B01D 27/08* (2013.01); *B01D 27/148* (2013.01); *B01D 36/001* (2013.01)

(58) Field of Classification Search
CPC ..... B01D 35/005; B01D 27/08; B01D 36/001
See application file for complete search history.

(56) References Cited

U.S. PATENT DOCUMENTS

| 5,435,915 A | 7/1995 | Connors, Jr. |
| 2007/0017370 A1* | 1/2007 | Clausen ............ B01D 19/0031 96/4 |
| 2011/0023721 A1 | 2/2011 | Tanis et al. |

FOREIGN PATENT DOCUMENTS

| DE | 19835525 C1 | 10/1999 |
| DE | 102011120387 A1 | 6/2012 |

* cited by examiner

*Primary Examiner* — Bobby Ramdhanie
*Assistant Examiner* — Donovan Bui-Huynh
(74) *Attorney, Agent, or Firm* — James Hasselbeck

(57) ABSTRACT

A filter element for filtering a fluid is provided with a first end disc and a second end disc. An annularly arranged filter medium is held between the first and second end discs. The filter medium can be flowed through by a fluid to be filtered in a radial direction relative to a longitudinal axis of the filter element from an exterior of the filter element to an interior of the filter element. A fluid outlet socket is connected to the filter medium and extends away from the filter medium in an axial direction past the first end disc. The fluid outlet socket is provided with a wall and at least one vent hole extending through the wall in the radial direction. A fluid filter is provided with a filter housing and with the afore described filter element that is arranged in the filter housing.

5 Claims, 3 Drawing Sheets

FILTER ELEMENT AND FLUID FILTER WITH RADIAL VENT HOLE

BACKGROUND OF THE INVENTION

The invention concerns a filter element as well as a fluid filter with a radial vent hole.

For filtering fluids, such as in particular fuels, fluid filters are employed in practice whose filter elements in general comprise an annularly arranged filter medium that is held between two end discs. The filter medium can be embodied in particular as a star-shaped folded bellows and can be comprised of a nonwoven or another textile material, for example.

The function of the fluid filter or of the filter element can be significantly disturbed by the introduction of a larger gas volume or air volume into the fluid filter. The filter medium often constitutes an unsurmountable barrier for passage of the introduced gas volume or air volume so that the introduced gas volume or air volume collects fluidically upstream of the filter medium of the filter element, i.e., at the so-called raw fluid side. Due to the compressibility or expansion capability of the introduced gas or of the introduced air, flow-through disturbances and, in an extreme case, a complete interruption of the fluid column may occur within the fluid filter. This is in particular a disadvantage in case of critical applications such as, for example, in fuel filtration for internal combustion engines.

WO 2007/010037 A1 discloses a fuel filter which is provided with a venting unit. The venting unit comprises a flow passage through which gases that collect within an end face area of the filter housing can be discharged. The flow passage extends in axial direction through an end disc at an end face of the filter element and connects a raw fluid side of the filter element with its clean fluid side. In operation, it is possible in this way that air or gas introduced into the fluid filter can pass to the clean fluid side by bypassing the filter medium and be guided out of the filter element together with the filtered fuel. The flow passage is covered at the inlet side by a screen body or filter body that is fastened to the filter element by means of a holding ring that is clipped onto the end disc.

In tight mounting situations, for example, in so-called (fuel) disposable filters in which the filter housing is exchanged together with the filter element arranged therein, the known filter element is usable only to a limited extent as a result of the required mounting space. Moreover, the filter element is producible only in a complex way and therefore is cost-intensive with regard to manufacture.

Object of the invention is to provide a filter element as well as a fluid filter that enable venting and that require only a minimal mounting space while having a simple constructive configuration.

SUMMARY OF THE INVENTION

The object concerning the filter element is solved in that the filter element comprises a first end disc and a second end disc; an annularly arranged filter medium that is held between the two end discs and that can be flowed through by the fluid to be filtered in a radial direction relative to the longitudinal axis of the filter element from the exterior to the interior; and a fluid outlet socket which extends away from the filter element in axial direction past one of the two end discs wherein the fluid outlet socket is provided with at least one vent hole which extends through its wall in a radial direction relative to the longitudinal axis.

The fluid filter according to the invention comprises a filter housing and a filter element as described above arranged in the filter housing.

In the fluid filter according to the invention, the vent hole is arranged in a fluid outlet socket which extends away from the filter element in axial direction past one of the two end discs. The vent hole extends through the wall of the fluid outlet socket in a radial direction relative to the longitudinal axis of the filter element. In this way, the filter element requires a smaller mounting space and can be produced in a simple and inexpensive way.

The vent hole is preferably provided with a screening element in order to separate or retain somewhat larger and large particulate contaminants that pass through the vent hole to the clean side of the filter element by bypassing the filter medium. In operational use of the filter element, an undesirable damage of component groups that are fluidically downstream of the filter element, for example, a pump, a fuel injection device or even an internal combustion engine, can be reliably counteracted in this way.

According to an especially preferred further embodiment of the invention, the screening element is arranged fluidically downstream of the vent hole in this context. Accordingly, the screening element can be resting, for example, immediately on the inner wall of the fluid outlet socket and optionally can be directly attached to the inner wall. Alternatively, the screening element can also be arranged spaced apart in radial direction relative to the outlet socket. In each one of the aforementioned embodiments, the filter element can be realized with a particularly minimal constructive size so that it can be utilized without a problem even in case of a minimal mounting space, for example, in a disposable filter.

The vent hole according to the invention can have in particular an opening cross-section that is sized such that in operation a gas volume or air volume which is passing through the vent hole will swirl and therefore be divided into gas bubbles or air bubbles having a respectively smaller partial volume. In practice, a free passage cross-section of less than 2.5 mm, in particular of approximately 2 mm, has been found useful. In this way, damage or a functional disturbance of component groups or components which are arranged fluidically downstream of the filter element (pump/fuel injection system/internal combustion engine) can be counteracted. Moreover, it has been found to be advantageous in this respect when the screening element with regard to its mesh width and its inflow surfaces at the circumference is designed such that larger gas volumes or air volumes are divided into smaller partial volumes, i.e., smaller individual bubbles. The screening element then serves in other words as a so-called "bubble breaker".

In case of a high degree of contamination of the fluid supplied to the filter element, there is the risk that a single vent hole of the filter element in operation will clog quickly. The filter element can therefore be provided with several such vent holes. In this context, the vent holes are preferably arranged spaced apart from each other in circumferential direction of the fluid outlet socket, preferably regularly spaced. In this way, a particularly efficient venting can be enabled.

According to the invention, the screening element is embodied preferably as a screening pipe that is arranged in the filter element and serves for final separation of water contained in the fluid. The screening pipe thus comprises in this case a dual function. On the one hand, the screening pipe serves for separation of particulate contaminants which in operation of the filter element pass through the vent hole from the raw fluid side of the filter element to the clean side of the filter element by bypassing the filter element. Moreover, the screening pipe serves as a final separation stage of a water separation device by means of which water contained in the fluid to be filtered is separated from the fluid. In this configuration the risk of undesirable clogging of the screening pipe by particulate contaminants, which pass with the gas or with the air via the vent hole to the clean side of the filter element, is minimal. This is advantageous for the service life of the filter element.

For this purpose, the water separation device of the filter element has preferably a water separation gap that is configured between the screening pipe and a central tube. The central tube surrounds the screening pipe and serves as an inwardly positioned support of the filter element or also of one or several coalescing layers which are fluidically arranged downstream of the filter medium.

According to the invention, the fluid outlet socket of the filter element can be formed by an end disc. Alternatively, the fluid outlet socket can also be formed by the screening pipe itself, i.e., by a free end section of the screening pipe. In both cases, additional components are obsolete so that the filter element is simplified and can be produced in an inexpensive way.

The fluid filter according to the invention, in particular for filtering fuel, comprises a filter housing and a filter element which is arranged in the filter housing and is embodied in the aforementioned way. The fluid filter can be in particular configured as an in-line mounted filter or as a so-called disposable filter.

The filter housing of the fluid filter comprises preferably a cover part with a centrally arranged outlet opening that is fluidically connected with the fluid outlet socket of the filter element. The cover part can have several inlet openings for the fluid which are arranged annularly about the outlet opening.

The inlet openings each can be aligned in the direction of the longitudinal axis of the fluid filter with a vent hole of the filter element. The filter housing can be provided at the bottom side with a water collecting space for water separated from the fluid to be filtered.

Particularly preferred, the filter element with the fluid outlet socket is contacting in axial direction seal-tightly the cover part of the filter housing. Between the fluid outlet socket and the cover part, a preferably elastically deformable annular sealing element, for example, a flat gasket, can be arranged.

BRIEF DESCRIPTION OF THE DRAWINGS

The invention will be explained in the following with the aid of embodiments illustrated in the drawing.

DESCRIPTION OF PREFERRED EMBODIMENTS

Figure 1:
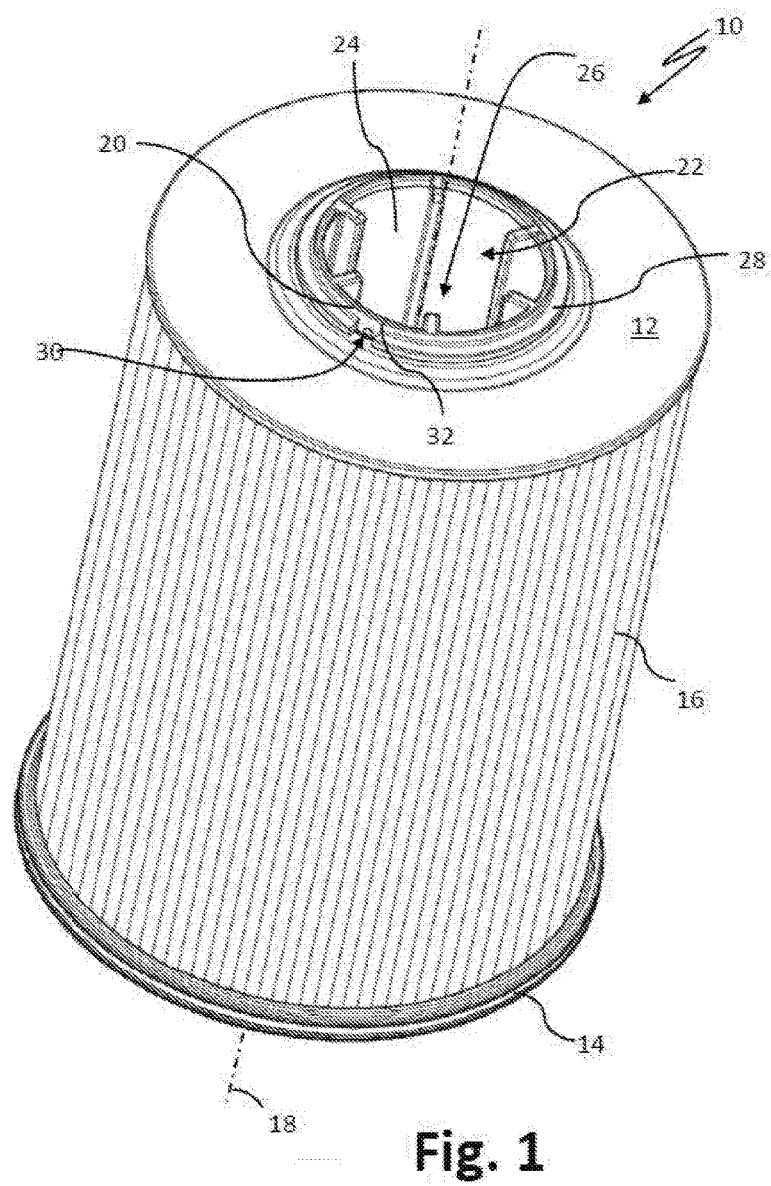
FIG. 1 shows in a perspective view a filter element for filtering a fluid, in particular fuel or oil, comprising an annularly arranged filter medium that is held between two end discs and that can be flowed through by the fluid to be filtered in a radial direction relative to the longitudinal axis of the filter element, wherein the filter element comprises a central fluid outlet socket with a vent hole that extends through a wall of the fluid outlet socket in a radial direction relative to the longitudinal axis.

FIG. 1 shows a filter element 10 for filtering a fluid, in particular fuel or oil. The filter element 10 comprises a first end disc 12 and a second end disc 14. Between the two end discs 12, 14, a filter medium 16 is arranged that is formed as a star-shaped folded bellows. The filter medium 16 is arranged annularly about the longitudinal axis 18 of the filter element 10 and can be flowed through by the fluid to be filtered in a radial direction relative to the longitudinal axis 18 from the exterior to the interior of the filter element 10. The filter medium 16 can be, for example, comprised of a nonwoven or of another textile material.

The filter element 10 in the embodiment illustrated in FIG. 1 is substantially configured rotation-symmetrical to the longitudinal axis 18.

The first end disc 12 of the filter element 10 is provided with a fluid outlet socket 20 that serves for guiding the fluid out of the filter element 10. The fluid outlet socket 20 is projecting away from the first end disc 12 in axial direction outwardly and has an outlet opening referenced by 22. The fluid outlet socket 20 is embodied as a component separate from the end disc 12.

A screening pipe 24 is contacting the inner side of the fluid outlet socket 20 and is provided with through openings for the fluid. The screening pipe 24 serves primarily as a final separator for separating water contained in the fluid. In the interior of the screening pipe 24, a central riser channel 26 of the filter element 10 is formed which is fluidically connected with the outlet opening of the fluid outlet socket 20. The screening pipe 24 can be comprised of a plastic material and in particular can be embodied as an injection-molded part. It is understood that the fluid outlet socket 20 can be integrally formed on the screening pipe 24. Alternatively, the fluid outlet socket 20 can also be integrally formed on the first end disc 12 of the filter element 10.

As can be seen in FIG. 1, in the present case the fluid outlet socket 20 is supported externally by an annular collar 28 on the first end disc 12. The annular collar 28 can be formed integrally on the fluid outlet socket 20.

The fluid outlet socket 20 is provided with a vent hole 30 which extends through its wall 32 in a radial direction relative to the longitudinal axis 18. Through the vent hole 30, a clean fluid side of the filter element 10, here the central riser channel 26, that is fluidically downstream of the filter medium 16 is thus fluidically connected with the exterior side of the fluid outlet socket 20 or of the first end disc 12 of the filter element 10. The vent hole 30 can have an inner passage cross-section diameter of 1 mm to 2.5 mm, preferably of approximately 2 mm. In accordance with an embodiment which is not disclosed in detail in the drawing, the filter element 10 can be provided with several vent holes 30. In this case, the vent holes 30 are arranged preferably at a spacing relative to each other in circumferential direction of the fluid outlet socket.

Via the venting hole or venting holes 30, in the operational use of the filter element, a gas volume or air volume which has collected outside of the filter element 10 can be evacuated, i.e., discharged, into the interior of the filter element 10 by bypassing the filter medium 16 and out of the filter element 10 via the fluid outlet socket 20.

Figure 2:
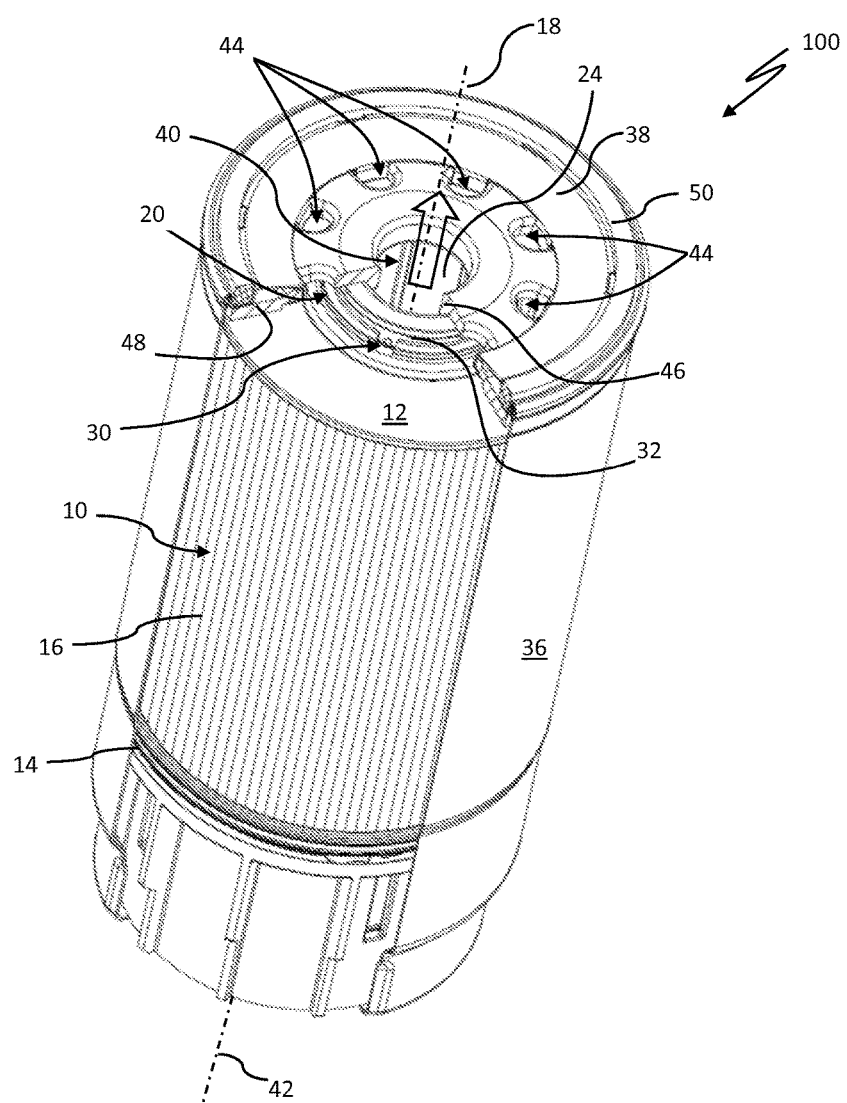
FIG. 2 shows in a partially cut-away perspective view a fluid filter with a filter housing in which the filter element illustrated in FIG. 1 is arranged, wherein the vent hole of the filter element at the inlet side connects fluidically a raw fluid side of the fluid filter and a clean fluid side of the fluid filter with each other so that an air volume or gas volume introduced into the fluid filter can pass to the clean fluid side of the filter element via the vent hole and by bypassing the filter medium of the filter element.

In FIG. 2, a fluid filter 100 in a partially cut-away perspective illustration is shown. The fluid filter 100 comprises a filter housing (36, 38) with a container part 36 and a cover part 38 attached thereto. The cover part 38 is pressure-tightly and fluid-tightly crimped at the edges to the container part 36 but can also be connected in another way pressure-tightly and fluid-tightly to the container part 36.

The filter element 10 shown in FIG. 1 is arranged in the filter housing 36, 38 of the fluid filter 100. The cover part 38 has a fluid outlet 40 for the fluid. The fluid outlet 40 is centrally arranged on the cover part 38 relative to the longitudinal axis 42 of the fluid filter 100. The longitudinal axis 42 of the fluid filter 100 may coincide, as is the case here, with the longitudinal axis 18 of the filter element 10.

In the cover part 38, several inlet openings 44 are formed by means of which the fluid passes into the fluid filter 100. The inlet openings 44 are of a circular shape and are arranged, spaced from each other, around the longitudinal axis 42 of the fluid filter 10.

According to a preferred embodiment of the fluid filter, each of the inlet openings 44 has correlated therewith a respective vent hole 30 of the fluid outlet socket 20.

The cover part 38 of the filter housing 36, 38 engages at the inner side with an annular rim profile 46 the fluid outlet socket 20 of the filter element 10. The end face of the fluid outlet socket 20 is contacting with its wall the inner side of the cover part 38 via an annular sealing element 48. The exterior side of the cover part 38 is provided with a sealing ring 50 in order to enable a pressure-tight and liquid-tight connection of the fluid filter 100, for example, on a filter head (not illustrated).

Figure 3:
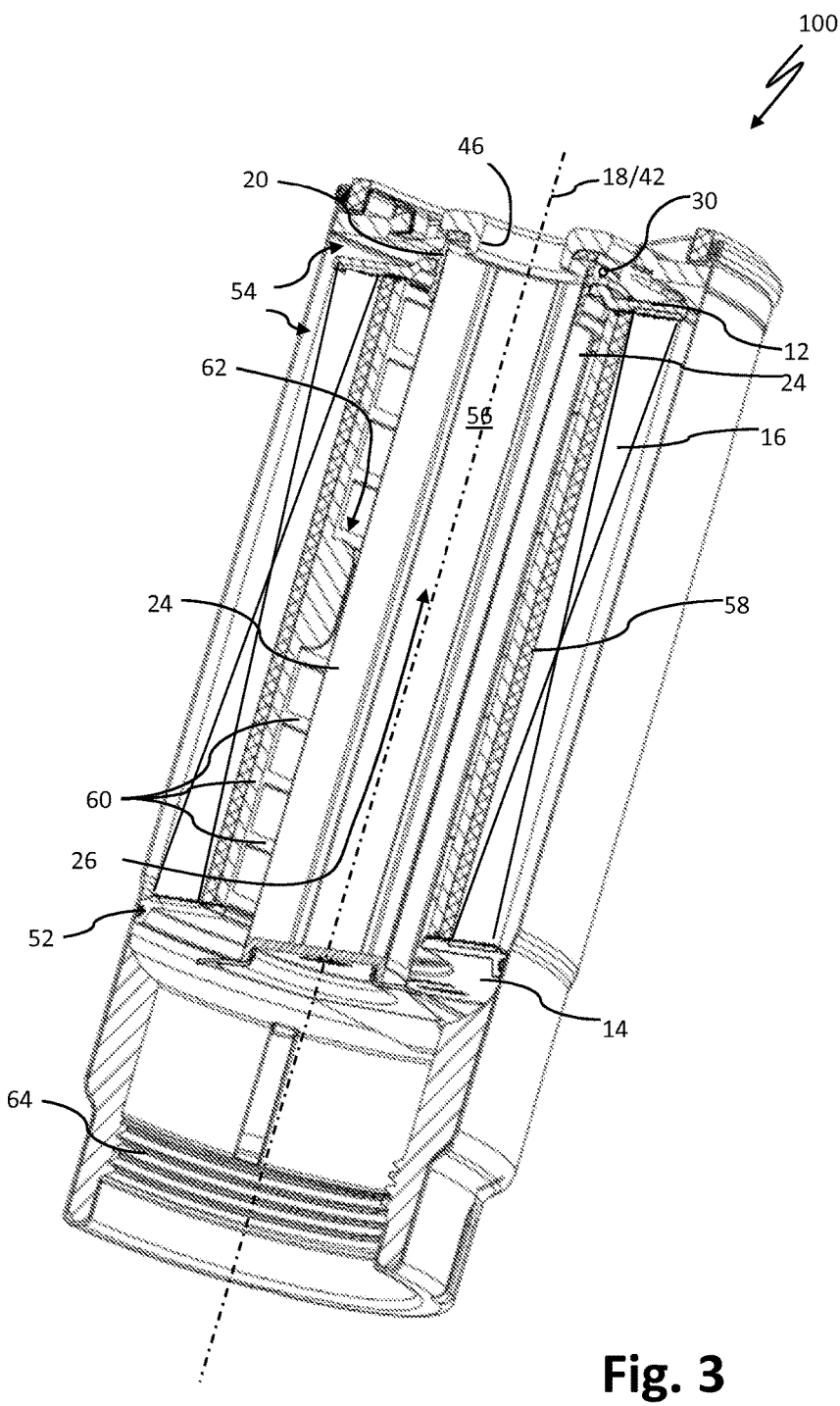
FIG. 3 shows the fluid filter of FIG. 2 in a perspective longitudinal section.

In FIG. 3, the fluid filter 100 which has been explained above in connection with FIG. 2 is illustrated in a longitudinal section and in a perspective view. The second end disc 14 of the filter element 10 is seal-tightly contacting via a radial sealing element 52 the inner side of the container part 36. By means of the radial sealing element 52, a raw fluid side 54 that is fluidically arranged upstream of the filter medium 16 is sealed at the filter housing relative to the clean fluid side 56 of the fluid filter 100 which is arranged fluidically downstream of the filter medium 16.

The screening pipe 24 with the fluid outlet socket 20 and the vent hole 30 can be seen easily in FIG. 3. The vent hole 30 connects the raw fluid side 54 with the clean fluid side 56 of the fluid filter 100. The screening pipe 24 is arranged fluidically downstream of the vent hole 30. In other words, the screening pipe is fluidically interposed between the vent hole 30 and the outlet opening 22 of the filter element 10 or the fluid outlet 40 of the fluid filter 100. Particulate contaminants that have passed from the raw fluid side 54 through the vent hole 30 into the interior of the filter element 10, i.e., to the clean fluid side 56, are separated from the fluid before the fluid is guided out of the filter element 10.

The filter element 10 comprises one or several coalescing layer(s) 58 at the clean side. The illustrated coalescing layer 58 and the filter medium 16 are supported at the inner side on a central tube 60. The central tube 60 is embodied as is known in the art as a grid-type tube. Between the central tube 60 and the screening pipe 24 an annular water separation gap 62 is formed. The water separation gap 62 is open at one end, i.e., in downward direction. Water which has been separated from the fluid to be filtered can therefore precipitate, following gravity, in downward direction and can be discharged from the filter element 10.

The filter housing 36, 38 of the fluid filter 100 is designed to be downwardly open in the illustrated embodiment. On the container part 36, at the bottom side, an inner thread 64 is formed into which a bottom part (not illustrated) can be screwed in order to close off the filter housing 36, 38 at the bottom side. Alternatively, the filter housing 36, 38 can be screwed by means of the inner thread 64 onto an outer thread, matching the inner thread 64, of a fluid filter holder that is not illustrated in more detail.

While specific embodiments of the invention have been shown and described in detail to illustrate the inventive principles, it will be understood that the invention may be embodied otherwise without departing from such principles.

What is claimed is:

1. A filter element for filtering a fuel, comprising:
   a. a first end disc and a second end disc;
   b. an annularly arranged filter medium held between the first and second end discs, wherein the annularly arranged filter medium is configured to be flowed through by the fuel to be filtered in a radial direction relative to a longitudinal axis of the filter element from an exterior of the filter element to an interior of the filter element;
   c. a fluid outlet socket connected to the annularly arranged filter medium and extending away from the annularly arranged filter medium in an axial direction past the first end disc;
   d. wherein the fluid outlet socket comprises:
      i. a fluid outlet opening having:
         (1) an axially extending circumferential outer wall radially enclosing the fluid outlet opening, the circumferential outer wall extending axially through a central opening of the first end disc; and
         (2) at least one vent hole formed in and extending in a radial direction through the circumferential outer wall of the fluid outlet socket into the fluid outlet opening, the at least one vent hole connecting a raw fluid side of the filter element to a clean fluid side of the filter element, thereby bypassing fuel around the filter medium without passing through the filter medium; and
      ii. a screening pipe arranged in an interior of the annularly arranged filter medium, the screening pipe interposed between the at least one vent hole of the axially extending circumferential outer wall and the fuel outlet opening,
      iii. wherein the screening pipe is configured to effect final separation of water contained in the fuel
   e. wherein the at least one vent hole is a plurality of vent holes;
   f. wherein said plurality of vent holes are arranged spaced apart from each other in the axially extending circumferential outer wall in a circumferential direction of the fluid outlet socket about the longitudinal axis;
   g. wherein the fuel flows through the filter element to generate a filtered fuel; and
   h. wherein an air volume which has collected outside of the filter element is discharged into the interior of the filler element by bypassing the annularly arranged filter medium and out of the filter element via the fluid outlet socket.

2. The filter element according to claim 1, wherein the screening pipe is arranged fluidically downstream of the at least one vent hole.

3. The filter element according to claim 1, wherein the fluid outlet socket is monolithically formed together with the screening pipe.

4. A fluid filler comprising a filler housing and a filter element for filtering a fuel, wherein
  a. the filter element is arranged in the filter housing,
  b. wherein the filter element comprises:
    i. a first end disc and a second end disc;
    ii. an annularly arranged filter medium held between the first and second end discs, wherein the annularly arranged filter medium is configured to be flowed through by the fuel to be filtered in a radial direction relative to a longitudinal axis of the filter element from an exterior of the filter element to an interior of the filter element;
    iii. a fluid outlet socket connected to the annularly arranged filter medium and extending away from the annularly arranged filter medium in an axial direction past the first end disc;
    iv. wherein the fluid outlet socket comprises:
      (1) a fluid outlet opening having:
      (2) an axially extending circumferential outer wall radially enclosing the fluid outlet opening, the circumferential outer wall extending axially through a central opening of the first end disc; and
      (3) at least one vent hole formed in and extending in a radial direction through the circumferential outer wall of the fluid outlet socket into the fluid outlet opening, the at least one vent hole connecting a raw fluid side of the filter element to a clean fluid side of the filler element, thereby bypassing fuel around the filter medium without passing through the filler medium; and
    v. a screening pipe arranged in an interior of the annular filter medium, the screening pipe interposed between the at least one vent hole of the axially extending circumferential outer wall and the fluid outlet opening,
    vi. wherein the screening pipe is configured to effect final separation of water contained in the fuel
  c. wherein the at least one vent hole is a plurality of vent holes;
  d. wherein said plurality of vent holes are arranged spaced apart from each other in the axially extending circumferential outer wall in a circumferential direction of the fluid outlet socket about the longitudinal axis;
  e. wherein the fuel flows through the filter element to generate a filtered fuel; and
  f. wherein an air volume which has collected outside of the filter element is discharged into the interior of the filter element by bypassing the annularly arranged filter medium and out of the filter element via the fluid outlet socket.

5. The fluid filter according to claim 4, wherein
  the filter housing comprises
    a cover part comprising a centrally arranged fluid outlet,
    wherein the fluid outlet is fluidically connected with the fluid outlet socket of the filter element,
    wherein the cover part comprises several inlet openings for the fluid and
    wherein the inlet openings are arranged around the outlet opening.

\* \* \* \* \*